Patented Feb. 19, 1952

2,586,675

UNITED STATES PATENT OFFICE 2,586,675

CHEWING GUM AND METHOD OF MAKING THE SAME

Wolfgang J. Lutz, Haag, Austria

No Drawing. Application February 15, 1949, Serial No. 76,640. In Austria February 21, 1948

10 Claims. (Cl. 99—135)

The present invention relates to chewing gum and to a process for making the same.

It is an object of the present invention to make a chewing gum that is more hygienic and more palatable and moreover is readily digestible and nutritional so that it may be swallowed without harmful effects.

If the starchy constituents of wheat grains are removed, for example by mastication, there remains a gumlike substance which has the properties of a chewing gum. It is sticky and elastic and tends to stay together in the form of a solid chewable mass. This mass is composed primarily of gluten protein, sometimes referred to merely as gluten.

In accordance with the present invention, the above mentioned properties of gluten are utilized in producing a chewing gum from the natural components of wheat. As compared with ordinary chewing gum, the mass consisting predominantly of gluten protein has, in particular, the advantage that it originates from a natural nutrient and therefore is more hygienic and more appetizing. Moreover, since it is a digestible and nutritional material, it is readily assimilated in the digestive tract if accidentally or intentionally swallowed. This eliminates the difficulties which are known to exist when chewing known types of chewing gum having an indigestible base.

The component of the wheat essential for producing the chewing gum, that is the gluten protein, is composed as well known by several components which are somewhat different chemically and physically. They are, however, used altogether in the chewable mass according to their natural proportion. The percentage of gluten of different kinds of wheat as well as of the flours produced from same varies between 10 and 30% in accordance with their sort and origin. Moreover quality of the gluten and, therefore, its qualification for producing chewing gum are different, which fact depends on the different sorts and on the kind of producing the flour. It is suitable to ascertain the qualification of the flour by examining samples. The gluten protein is to be found not only in the whole-meal flour but also in the fine flour.

The separation or extraction of the glutenous material from the wheat is effected in any suitable manner, for example by kneading wheat flour with water to form a dough and removing the starch from this dough by continuous stirring and kneading with running water or with water that is repeatedly changed. The starch removed from the dough is readily recovered from the water so that it need not be wasted. The remaining residue consists of gluten protein which in this wet condition possesses the desired properties but is not directly applicable to the purposes of the present invention because it is not durable in this form.

A serious difficulty in the use of gluten protein for the above mentioned purpose arises from the fact that when permitted to dry after its extraction in the manner indicated above it hardens into a glue-like vitreous mass and in this form it can neither be chewed nor again be made to swell in the mouth by the absorption of moisture.

In accordance with the present invention, it has been found that these difficulties can be overcome by adding to the gluten after its isolation a substance which will prevent the complete hardening of the gluten when drying out and, at the same time, has the property of not impairing the subsequent absorption of water by the gluten when it is chewed. The added material must, of course, have no deleterious effects when chewed or swallowed and should preferably be digestible and nutritional. It has been found that the desired results are obtained by using glycerine. Glycerine is particularly suitable since it is readily assimilated in the digestive tract and has the additional advantage that it is a sweetening substance.

In carrying out the process of the present invention, it has been found advisable to dry the gluten protein after its separation from the wheat. Since the wet gluten tends to fermentate, which fermentation destroys its elasticity and influences unfavourably the taste of the product, the drying of the gluten should be performed as quick as possible. Furthermore, as temperatures exceeding 115° F. are also apt to destroy the elasticity of the gluten the drying should be effected at temperatures below this level preferably by using vacuum. For the same reason already when grinding and preparing the flour one has to look for avoiding an unnecessary heating. After the gluten protein has been sufficiently dried, it is ground to a fine powder and then mixed with the glycerine. The percentage of glycerine necessary for it varies between 15 and 30% of weight of the whole mass, the final product being the softer and more easily kneadable the greater the percentage of the glycerine. After a time of ripening which amounts from one to six hours the freshly mixed mass has been bound. This period is necessary for the glycerine to completely penetrate the gluten and swell it. It is suitable to advance this process of binding by applying an overpressure of approximately 4 to 17 lbs. on square inch, whereby the homogeneity of the final product is increased. The mass thus obtained can be easily divided and shaped into sticks, pellets or other desired form. The material thus produced has the consistency of a thick dough and maintains a plastic elasticity which permits deformation and separation by biting without crumbling when it is chewed. It further has the property of quickly swelling under the action of chewing and becoming still more plastic and elastic with substantially the same "feel" as ordinary chicle base gum.

The chewing gum produced in accordance with the present invention can be improved by adding natural and/or artificial flavors. The pieces of gum may also be sugar-coated or candy-coated if desired. It has been found that, as compared with the usual chewing gum, the gluten protein retains the sweetening and flavoring substances longer.

While it has previously been proposed to use gluten protein as an addition to chewing gum masses consisting of gum and resins, the percentage of this protein being about 1/8 of the total mass, the chewing gum according to the present invention is clearly distinguished from such prior proposals in that it consists predominantly of gluten protein. Although small or moderate percentages of other materials may be used as binders or as fillers, the chewing gum should contain at least 60% of gluten protein, and preferably not less than 70%. It is undesirable to use additives that are not digestible. For securing the binding ability of the gluten, also during the progress of its production, application of heat, especially over 115° F. has to be avoided.

There is thus produced, in accordance with the present invention, a chewing gum which is more hygienic and appetizing than those heretofore available and is moreover not only digestible but also nutritional. It hence produces no ill-effects if swallowed but, on the contrary, is wholly palatable and, in addition, has an appreciable food value.

What I claim and desire to secure by Letters Patent is:

1. Chewing gum consisting of more than 50% gluten protein, and containing at least about 15% glycerine and flavoring material.

2. Chewing gum comprising an amorphous mass consisting of more than 50% wheat gluten protein, and containing at least about 15% glycerine, water and flavoring material.

3. Chewing gum comprising an amorphous mass consisting of more than 50% wheat gluten protein, 15 to 30% of glycerine, water and flavoring material.

4. Chewing gum comprising an amorphous mass consisting of at least about 70% wheat gluten protein and containing 15 to 30% glycerine as a binding agent which binds the gluten without impairing its ability to swell, prevents it from hardening when drying out and preserves it in an elastic and chewable state.

5. A method of making chewing gum which comprises extracting gluten from wheat, drying the gluten at low temperature, grinding the dried gluten to a fine powder, and plasticizing the powdered gluten with glycerine, the quantity of powdered gluten and glycerine being selected to provide a mixture containing more than 50% gluten and at least about 15% glycerine.

6. A method of making chewing gum which comprises extracting gluten from wheat, drying the gluten at a temperature not exceeding 115° F., grinding the dried gluten to a fine powder, and plasticizing the powdered gluten with glycerine, the quantity of powdered gluten and glycerine being selected to provide a mixture containing at least about 60% gluten and 15 to 30% glycerine.

7. A method of making chewing gum which comprises extracting gluten from wheat, drying the gluten at low temperature, grinding the dried gluten to a fine powder, and plasticizing the powdered gluten with glycerine, said powder and said glycerine being selected to produce a mass containing at least about 60% gluten and 15 to 30% glycerine, separating the mass into small pieces and coating said pieces with sugar.

8. Chewing gum comprising an amorphous mass consisting predominantly of gluten protein and containing glycerine as an agent which binds the gluten without impairing its ability to swell, prevents it from hardening when drying out and preserves it in an elastic and chewable state, the proportion of gluten protein in the mass being not less than 60%, and the proportion of said glycerine being at least about 15%.

9. Chewing gum comprising an amorphous mass consisting predominantly of gluten protein and containing glycerine as an agent which binds the gluten without impairing its ability to swell, prevents it from hardening when drying out and preserves it in an elastic and chewable state, the percentage of gluten protein in the mass being not less than 60 and the percentage of glycerine being between 15 and 30.

10. Chewing gum comprising an amorphous mass consisting of digestible ingredients comprising 60% to 85% of gluten protein and 15% to 30% of glycerine, the gluten protein being in a finely divided state and the glycerine acting as a binding agent which binds the gluten without impairing its ability to swell, prevents it from hardening when drying out and preserves it in an elastic and chewable state.

WOLFGANG J. LUTZ.

REFERENCES CITED

The following references are of record in the file of this patent:

UNITED STATES PATENTS

| Number | Name | Date |
| --- | --- | --- |
| 1,402,817 | Weber | Jan. 10, 1922 |
| 2,203,436 | Kertess | June 4, 1940 |

FOREIGN PATENTS

| Number | Country | Date |
| --- | --- | --- |
| 16,504 | Australia | Oct. 30, 1928 |